(12) United States Patent
Durrant et al.

(10) Patent No.: US 7,350,981 B2
(45) Date of Patent: Apr. 1, 2008

(54) FIBER OPTIC BUILDOUT CONVERTER, PHYSICAL CONTACT TO EXPANDED BEAM

(75) Inventors: Richard C. E. Durrant, Algonquin, IL (US); Mark Waldron, Poplar Grove, IL (US)

(73) Assignee: Stratos International, Inc., Chicago, IL (US)

( * ) Notice: Subject to any disclaimer, the term of this patent is extended or adjusted under 35 U.S.C. 154(b) by 18 days.

(21) Appl. No.: 11/430,800

(22) Filed: May 9, 2006

(65) Prior Publication Data

US 2007/0263959 A1 Nov. 15, 2007

(51) Int. Cl.
*G02B 6/38* (2006.01)

(52) U.S. Cl. ............... 385/55; 385/72; 385/74

(58) Field of Classification Search ............ 385/55–64, 385/71–78
See application file for complete search history.

(56) References Cited

U.S. PATENT DOCUMENTS

| 4,884,861 | A |   | 12/1989 | Nodfelt .................... 350/96.18 |
| 4,900,124 | A | * | 2/1990 | Lampert et al. ............... 385/73 |
| 4,902,094 | A | * | 2/1990 | Shank .......................... 385/55 |
| 5,000,536 | A | * | 3/1991 | Anderson et al. ............. 385/69 |
| 5,247,595 | A |   | 9/1993 | Foldi .......................... 385/78 |
| 6,234,683 | B1 |  | 5/2001 | Waldron et al. ............... 385/78 |
| 6,305,849 | B1 |  | 10/2001 | Roehrs et al. ................ 385/59 |
| 6,357,929 | B1 |  | 3/2002 | Roehrs et al. ................ 385/59 |
| 6,371,660 | B1 |  | 4/2002 | Roehrs et al. ................ 385/59 |
| 6,913,402 | B2 |  | 7/2005 | Bohlin et al. ................. 385/93 |
| 2004/0033028 | A1 | * | 2/2004 | Cheng ......................... 385/55 |

OTHER PUBLICATIONS

Defense Logistics Agency, MIL-C-83526/13(CR), Military Specification Sheet entitled "Connector, Fiber Optic, Circular, Hermaphroditic, Bulkhead Mounting, 2 Positions," pp. 1-10, Jun. 9, 1989, Columbus, Ohio, and printed off of a web site at http://www.dscc.dla.mil/Downloads/MilSpec/Docs/MIL-C-83526/mil83526ss13.pdf.
Defense Logistics Agency, Proposed Revisions to MIL-PRF-83526/16, Performance Specification Sheet entitled "Connector Plug, Fiber Optic, Circular Hermaphroditic, In-Line Mounting, Multiple Position," draft pp. 1-10, Sep. 15, 2005, Columbus, Ohio, and printed off of a web site at http://www.dscc.dla.mil/Downloads/MilSpec/Docs/MIL-C-83526/idprf83526ss16.pdf.

* cited by examiner

*Primary Examiner*—Hemang Sanghavi
(74) *Attorney, Agent, or Firm*—Karl D. Kovach (57) ABSTRACT

The fiber optic buildout converter includes a housing, a first fiber optic connector, and a second fiber optic connector. The housing has a first end and a second end. The first fiber optic connector is located near the first end of the housing, and the first fiber optic connector has a first interface style. The second fiber optic connector is located near the second end of the housing, and the second fiber optic connector has a second interface style. The second interface style of the second fiber optic connector is different that the first interface style of the first fiber optic connector. Furthermore, the second fiber optic connector is in optical communication with the first fiber optic connector.

13 Claims, 8 Drawing Sheets

FIBER OPTIC BUILDOUT CONVERTER, PHYSICAL CONTACT TO EXPANDED BEAM

BACKGROUND OF THE INVENTION

1. Field of the Invention

The present invention pertains to fiber optic connectors. The invention more particularly concerns a fiber optic connector which enables a user to easily convert from one fiber optic connector interface to a second fiber optic connector interface.

2. Discussion of the Background

Fiber optic connectors and cables are known in the art. Typically, a fiber optic cable is terminated at each end by a respective fiber optic connector. At least two categories of fiber optic connectors exist and include physical contact connectors and expanded beam connectors. In practice, a fiber optic cable terminated with physical contact connectors will only connect to other fiber optic cables which are also terminated with physical contact connectors. Likewise, in practice, a fiber optic cable terminated with expanded beam connectors will only connect to other fiber optic cables which are also terminated with expanded beam connectors.

Physical contact connectors are characterized as such since one end of a ferrule of a first fiber optic connector physically contacts one end of a ferrule of a second fiber optic connector. Light exiting the core of the optical fiber held within the ferrule of the first fiber optic connector is then immediately introduced into the core of the optical fiber held within the ferrule of the second fiber optic connector. If the two cores are misaligned by more than a whole number of diameters of the core of the optical fiber, then most of the optical power is not exchanged from the core of the first fiber optic connector to the core of the second fiber optic connector. If a piece of debris is caught between the core of the first fiber optic connector and the core of the second fiber optic connector, then it is probable that no optical power will be exchanged from the core of the first fiber optic connector to the core of the second fiber optic connector, assuming that the debris has a size which is approximately the same size or larger than the size of the core of one of the optical fibers. An example of a physical contact connector is set forth in U.S. Pat. No. 6,234,683. U.S. Pat. No. 6,234,683 is hereby incorporated herein by reference.

Figure 1:
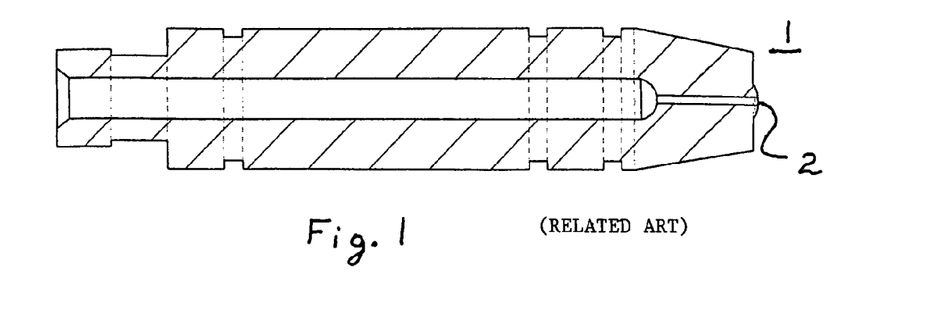
FIG. 1 is a cross-section side view of a prior art biconical terminus.
Figure 2:
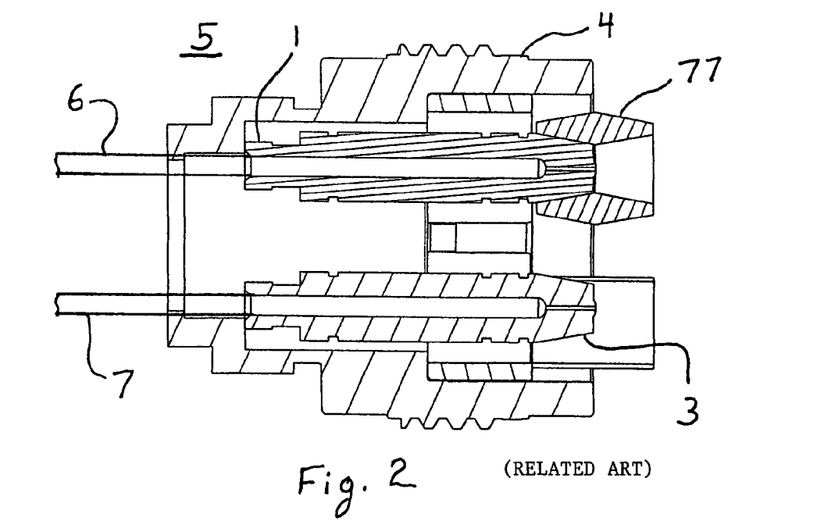
FIG. 2 is a cross-sectional side view of a prior art fiber optic connector which incorporates the prior art biconical terminus of FIG. 1.
Figure 3:
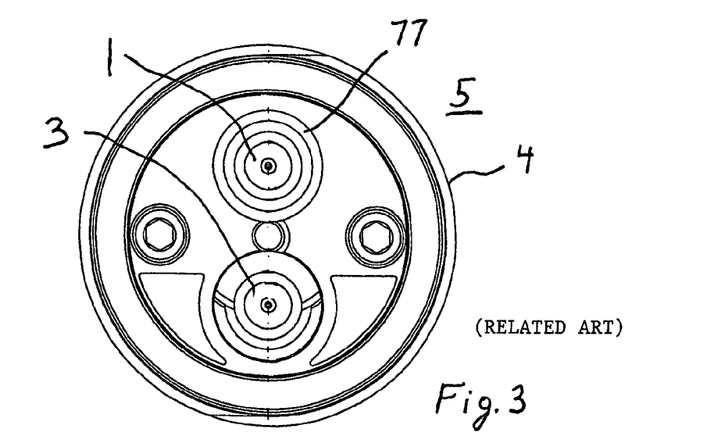
FIG. 3 is an end view of the prior art fiber optic connector of FIG. 2.

FIG. 1 is a side view of a biconical terminus 1. The biconial terminus 1 is used to terminate an optical fiber. The biconical terminus 1 is used in one type of physical contact, or nearly physical contact, connector. In use, in a connected state, a mating end 2 of the biconical terminus 1 would physically contact, or nearly physically contact, a mating end of another biconical terminus (not shown). FIG. 2 is a cross-sectional side view of two biconical termini 1, 3, and a biconical terminus sleeve 77 in a housing 4 so as to form a fiber optic connector 5. Biconical terminus 1 is located at one of the terminal ends of a first optical fiber 6, and biconical terminus 3 is located at one of the terminal ends of a second optical fiber 7. FIG. 3 is an end view of the fiber optic connector 5 of FIG. 2. As shown in the end view of FIG. 3, the centers of the biconical termini 1, 3 lie on the same axis and are separated form each other by a distance of one half inch and each is separated from the center of the housing 4 by an equal amount. FIGS. 1, 2, and 3 are illustrations derived from a document identified as MIL-C-83526/13(CR), which is dated Jun. 9, 1989.

Expanded beam connectors are characterized as such since the optical fiber of the fiber optic cable is mated with a lens, typically a ball lens. The expanded beam fiber optic connector hold the terminated end of the optical fiber adjacent to the lens. When optical power exits the core of the optical fiber, the optical power then enters the lens, and then eventually exits the lens. The lens causes the optical power, or light, to diverge or expand before the optical power exits the fiber optic connector. If a second expanded beam fiber optic connector is attached to the first expanded beam fiber optic connector, then, after the optical power exits the first expanded beam fiber optic connector in the expanded state, the optical power will enter the second expanded beam fiber optic connector. The optical power will enter the lens of the second expanded beam fiber optic connector and then exit the lens. The lens of the second expanded beam fiber optic connector causes the optical power to converge. The focal point of the lens of the second expanded beam fiber optic connector is centered at the core of the optical fiber of the second fiber optic cable so that substantially all of the optical power exiting the lens enters the optical fiber. If the two cores are misaligned by less than a whole number of diameters of the core of the optical fiber, then most of the optical power is exchanged from the core of the first fiber optic connector to the core of the second fiber optic connector. If a piece of debris is caught between the lens of the first fiber optic connector and the lens of the second fiber optic connector, then it is probable that some of the optical power will be exchanged from the core of the first fiber optic connector to the core of the second fiber optic connector, assuming that the debris has a size which is approximately the same size or larger than the size of the core of one of the optical fibers but is smaller than the diameter of the expanded beam. Examples of expanded beam connectors are set forth in U.S. Pat. No. 5,247,595. U.S. Pat. No. 5,247,595 is hereby incorporated herein by reference.

Figure 4:
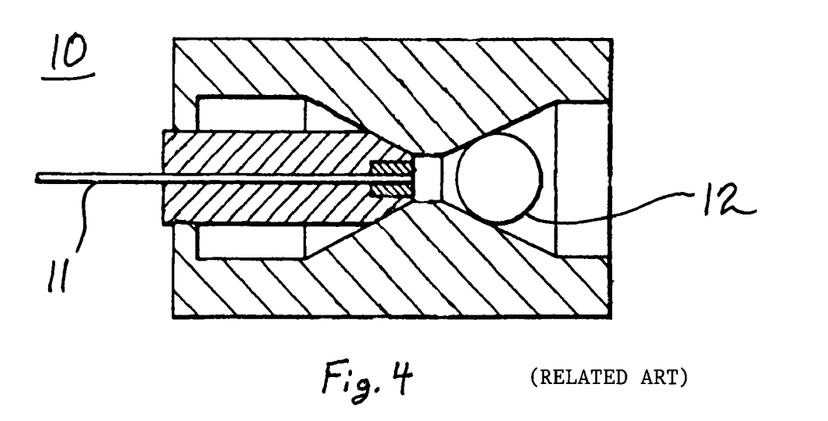
FIG. 4 is a cross-sectional side view of a prior art expanded beam fiber optic connector.
Figure 5:
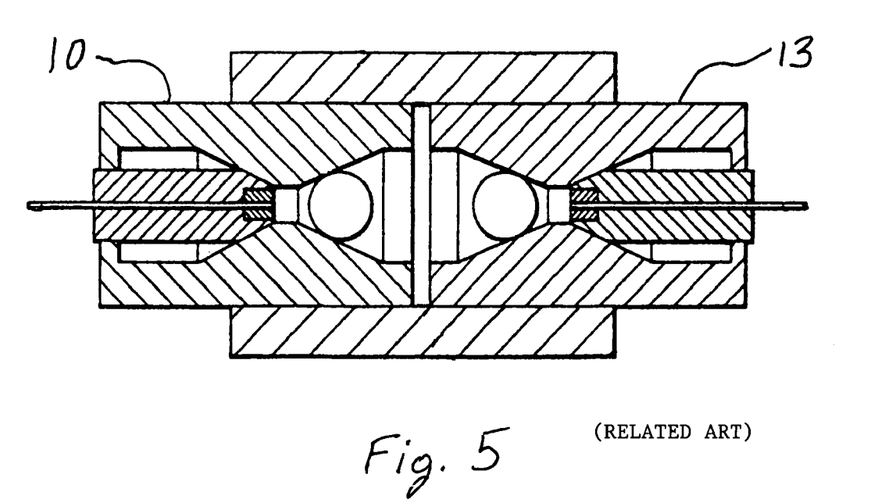
FIG. 5 is a cross-sectional side view of a prior art assembly which includes the prior art expended beam fiber optic connector of FIG. 4 and another expanded beam fiber optic connector where each of the expanded beam fiber optic connectors are positioned so as to enable optical communication between each of the two expanded beam fiber optic connectors.

FIG. 4 is a cross-sectional side view of an expanded beam connector 10 that includes an optical fiber 11 and a lens 12. FIG. 5 is a cross-section side view of two expanded beam connectors 10, 13 which are readied for optical communication with one another. FIGS. 4, and 5 are illustrations derived from figures found U.S. Pat. No. 5,247,595.

Hybrid fiber optic cables are also known in the art. To convert from one interface style of fiber optic connector to a second interface style of fiber optic connector, a person would cut a first fiber optic cable into two pieces and a second fiber optic cable into two pieces. The first fiber optic cable has fiber optic connectors that conform to a first interface style, and the second fiber optic cable has fiber optic connectors that conform to a second interface style. The person then splices the optical fibers from one piece of the first fiber optic cable to the optical fibers of one piece of the second fiber optic cable so as to form a hybrid fiber optic cable that includes a fiber optic connector which conforms to a first interface style and a second fiber optic connector that conforms to a second interface style. Thus the hybrid fiber optic cable can simultaneously connect to two fiber optic cables where each of the two fiber optic cables have dissimilar fiber optic connector interface styles.

Accordingly, there is a need for a device which easily enables the coupling of fiber optic cable to a second fiber optic cable where the first and second fiber optic cables include dissimilar fiber optic connectors.

SUMMARY OF THE INVENTION

It is an object of the invention to provide a device which is mountable to a fiber optic bulkhead connector and to a fiber optic cable.

It is another object of the invention to provide a device which is mountable to two fiber optic cables.

It is yet another object of the invention to provide a device which is mountable to either a fiber optic cable or a fiber optic bulkhead connector.

It is still another object of the invention to provide a device which enables a first type of fiber optic interface style to be optically connected to a second type of fiber optic interface style.

It is a further object of the invention to provide a device which enables a physical contact fiber optic connector to be optically connected to an expanded beam fiber optic connector.

It is another object of the invention to provide a device which utilizes a common fiber optic element in both a physical contact fiber optic connector and an expanded beam fiber optic connector.

In one form of the invention the device includes a housing, a first fiber optic connector, a second fiber optic connector, a first optical fiber, and a second optical fiber. The housing has a first end and a second end. The first fiber optic connector is located near the first end of the housing, and the first fiber optic connector has a first interface style. The second fiber optic connector is located near the second end of the housing, and the second fiber optic connector has a second interface style. The second interface style of the second fiber optic connector is different that the first interface style of the first fiber optic connector. Furthermore, the second fiber optic connector is in optical communication with the first fiber optic connector. The second interface style of the second fiber optic connector is compatible with and mateable to a physical contact fiber optic connector. The first optical fiber is in optical communication with both the first fiber optic connector and the second fiber optic connector. The second optical fiber is in optical communication with both the first fiber optic connector and the second fiber optic connector.

In a second form of the invention the device includes a main housing, a first housing, a second housing, a first ferrule, a second ferrule, a third ferrule, a fourth ferrule, a first ball lens, a second ball lens, a biconical housing, a biconical sleeve, a first optical fiber, and a second optical fiber. The main housing has a first end and a second end. The first housing is located near the first end of the main housing. The first housing has a thread form for connection to at least one of a dust cap and an expanded beam fiber optic connector. The second housing is located near at least one of the first end of the main housing and the second end of the main housing. The second housing has a thread form for connection with at least one of a dust cap and a physical contact fiber optic connector. The first ferrule is mounted to the first housing. The second ferrule is mounted to the first housing. The first ball lens is mounted to the first housing. The second ball lens is mounted to the first housing. The biconical housing is mounted to the second housing. The biconical housing has an aperture. The third ferrule is slidably mounted in the aperture of the biconical housing. The biconical sleeve is mounted to the second housing. The biconical sleeve has an aperture. The fourth ferrule is slidably mounted in the aperture of the biconical sleeve. The first optical fiber has a first end and a second end. The first end of the first optical fiber is terminated in the first ferrule, and the second end of the first optical fiber is terminated in the third ferrule. The first end of the first optical fiber is in optical communication with the first ball lens. The second optical fiber has a first end and a second end. The first end of the second optical fiber is terminated in the second ferrule, and the second end of the second optical fiber is terminated in the fourth ferrule. The first end of the second optical fiber is in optical communication with the second ball lens.

In a third form of the invention the device includes a housing, a first fiber Optic connector, a second fiber optic connector, a first optical fiber, and a second optical fiber. The housing has a first end and a second end. The first fiber optic connector is located near the first end of the housing, and the first fiber optic connector has a first interface style. The second fiber optic connector is located near the second end of the housing, and the second fiber optic connector has a second interface style. The second interface style of the second fiber optic connector is different that the first interface style of the first fiber optic connector. Furthermore, the second fiber optic connector is in optical communication with the first fiber optic connector. The first interface style of the first fiber optic connector is compatible with and mateable to an expanded beam fiber optic connector. The first optical fiber is in optical communication with both the first fiber optic connector and the second fiber optic connector. The second optical fiber is in optical communication with both the first fiber optic connector and the second fiber optic connector.

Thus, the invention achieves the objectives set forth above. The invention provides an optical device which is mountable to a fiber optic bulkhead connector, is connectable to a fiber optic cable, can interconnect two different interface styles of fiber optic connectors, and is compact. Furthermore, as compared to the known art, the invention is economical to manufacture, and has increased reliability.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Referring now to the drawings, wherein like reference numerals designate identical or corresponding parts throughout the several views, and more particularly to FIGS. 6-15 thereof, an embodiment of the present invention is a device or fiber optic buildout converter 20, 120 which is displayed therein. Specifically, the device 20, 120, as disclosed in the figures, provides the user with the ability to convert from one type of fiber optic connection, such as expanded beam, to another type of fiber optic connection, such as physical contact.

Figure 6:
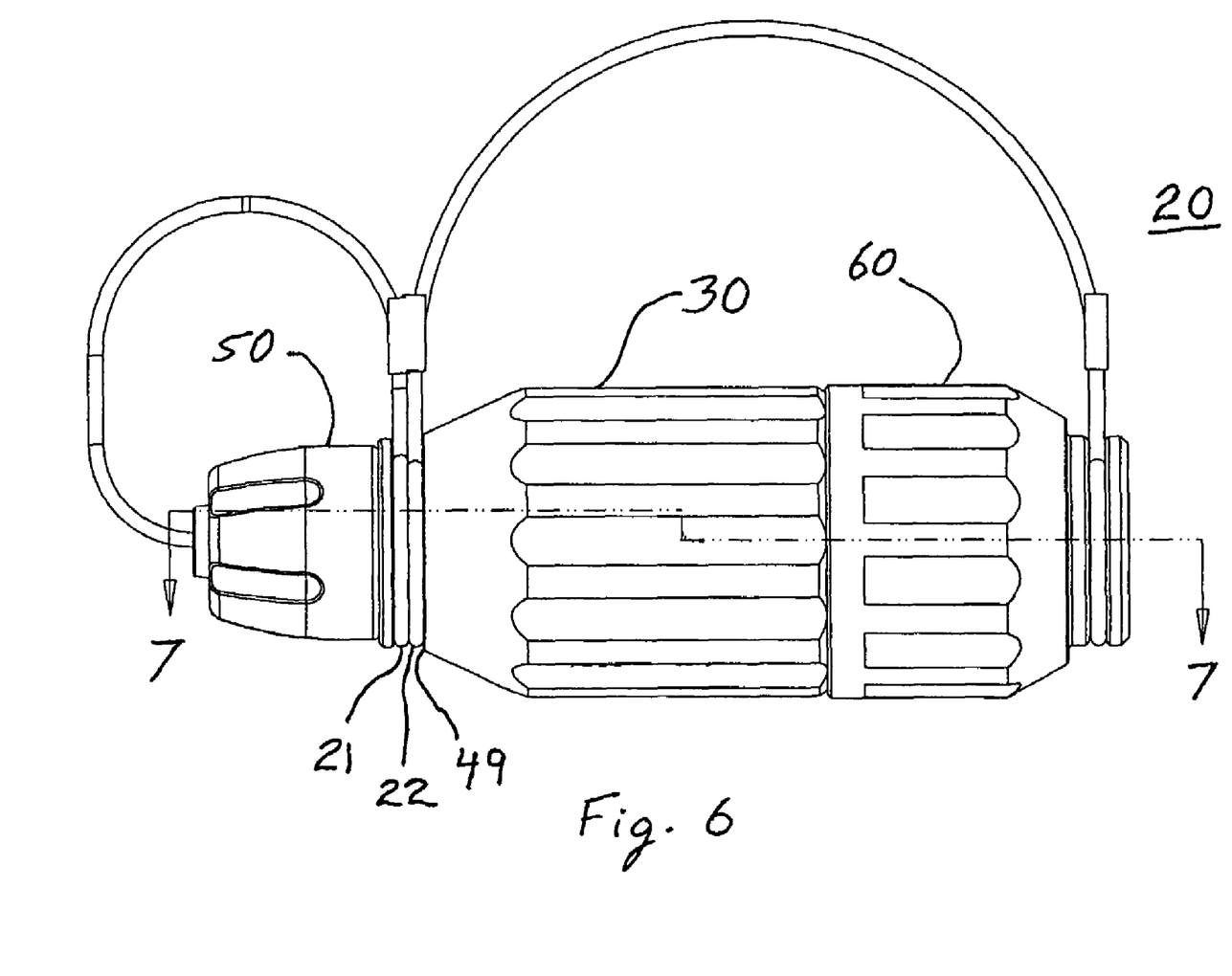
FIG. 6 is a side view of a fiber optic buildout converter of the invention.

FIG. 6 is a side view of the device or fiber optic buildout converter 20. The device 20 includes a nut or main housing 30, a dust cap 50, a dust cap 60, a lanyard 21, and a lanyard 22. The dust cap 50 threadably engages the remainder of the device 20. In use, the dust cap 50 can be removed from the remainder of the device 20 so as to expose one of the fiber optic connectors of the device 20. Also, when the device 20 is in use, the lanyard 21 keep the dust cap 50 from becoming lost. When the device 20 is not in use, the dust cap 50 can be threaded onto the remainder of the device 20 so as to keep dust from fouling up the fiber optic connector. In a similar manner, the dust cap 60 protects the second fiber optic connector of the device 20. Also, in a similar manner, the lanyard 22 secures the dust cap 60 to the device 20 when the device 20 is in use. The lanyard 21, and the lanyard 22 are secured to the main housing 30 by being tied-up tight to a lanyard groove 49 formed in the main housing 30.

Figure 7:
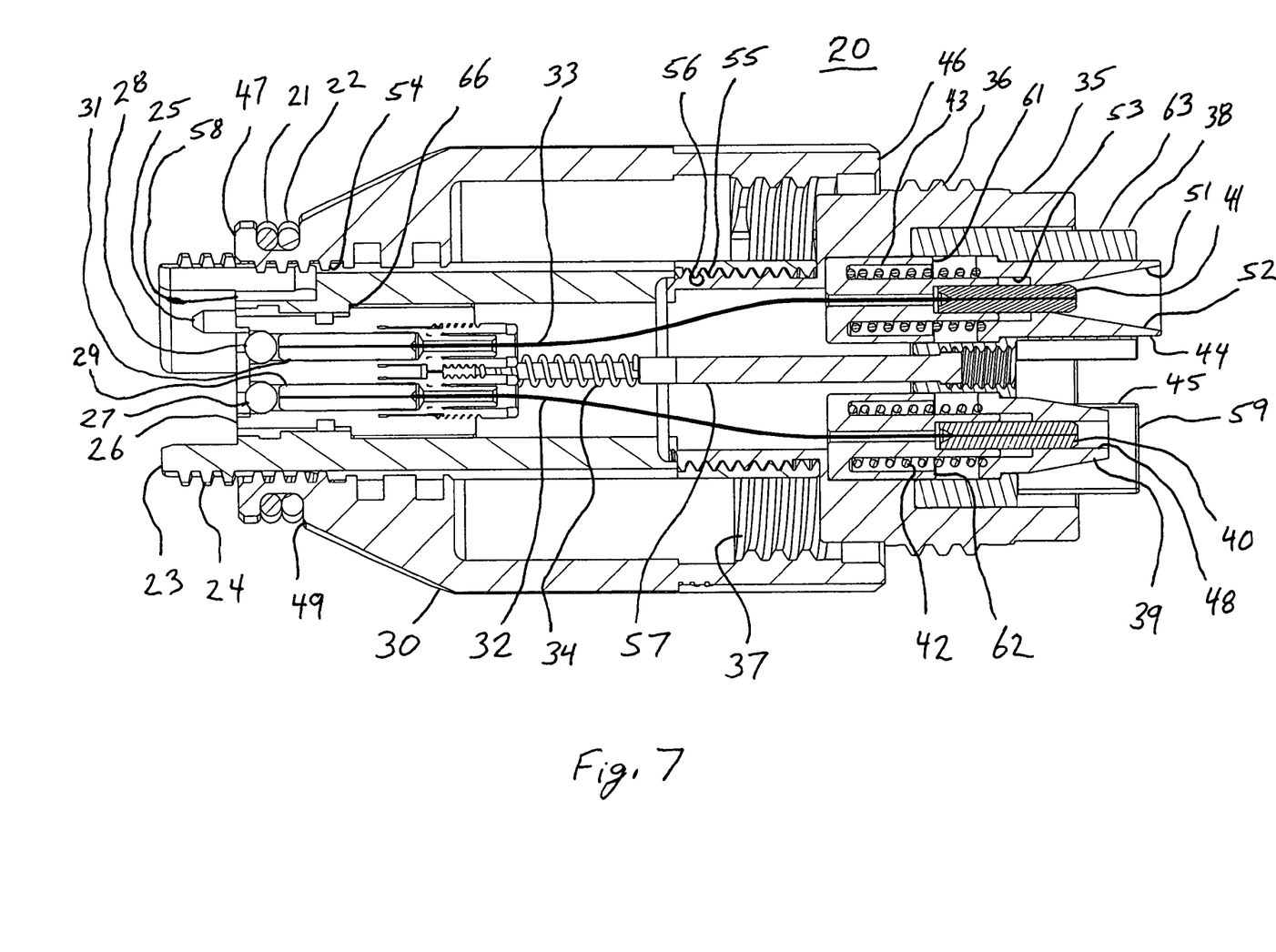
FIG. 7 is an expanded, cross-section side view of the fiber optic buildout converter taken along section line 7-7 of FIG. 6 with the dust caps removed.

FIG. 7 is an expanded, cross-sectional side view of the device 20 taken along section line 7-7 of FIG. 6 with the dust caps 50, 60 removed. The main housing 30 includes a first thread form 54 and a second thread form 37. The main housing 30 has a first end 47 and a second end 46. A fiber optic connector 58 is located near the first end 47 of the main housing 30 and another fiber optic connector 59 is located near the second end 46 of the main housing 30.

The fiber optic connector 58 is an expanded beam fiber optic connector that is characterized by the use of the lenses 27, 28. The lenses 27, 28 are ball lenses. Also, fiber optic connector 58 includes the first housing 23, ferrules 29, 31, the positioning post 25, and the plug insert 26. The first housing 23 includes a first thread form 24 which is used to interconnect with other expanded beam fiber optic connectors which are part of an optical cable or a bulkhead connector. The first housing 23 and the positioning post 25 help to properly key, or maintain the proper orientation of, the fiber optic connector 58 with the other fiber optic connector with which it interconnects. The device 20 also includes a first optical fiber 33 which has two ends. One end of the first optical fiber 33 is held by the ferrule 31. The device 20 also includes a second optical fiber 32 which has two ends. The lens 28 is in optical communication with the one end of the optical fiber 33 held by the ferrule 31. The lens 27 is in optical communication with the one end of the optical fiber 32 held by ferrule 29. The plug insert 26 holds the lenses 27, 28, the ferrules 29, 31, and the positioning post 25. The plug insert 26 is held by the first housing 23. The lenses 27, 28, ferrules 29, 31, positioning post 25, and plug insert 26 are held in place in accordance with practices well known in the art which can include adhesives, retaining clips, and thread fasteners. The first housing 23 also includes a second thread form 56.

The fiber optic connector 59 is a physical contact fiber optic connector that is characterized by the use of the ferrules 40, 41 which make physical contact of respective ferrules of a compatible physical contact fiber optic connector. Fiber optic connector 59 further includes the second housing 35, plug insert 38, biconical housing 39, biconical sleeve 44, springs 42, 43, and spring seats 61, 62. The second housing 35 includes a first thread form 36 which is used to interconnect with other physical contact fiber optic connectors which are part of an optical cable or a bulkhead connector. The plug insert 38 includes keys 45, 63. The keys 45, 63 help to properly key, or maintain the proper orientation of, the fiber optic connector 59 with the other fiber optic connector which it interconnects. The second end of the first optical fiber 33 is held by the ferrule 41. The second end of the second optical fiber 32 is held by the ferrule 40. Thus, the lens 28 is in optical communication with the second end of the first optical fiber 33, and the lens 27 is in optical communication with the second end of the second optical fiber 32. The ferrule 41 is held by the spring seat 61. The spring 43 is retained between the spring seat 61 and the biconical sleeve 44. The biconical sleeve 44, and the spring seat 61 are retained between the plug insert 38 and the second housing 35. The ferrule 40 is held by the spring seat 62. The spring 42 is retained between the spring seat 62 and the biconical housing 39. The biconical housing 39, and the spring seat 62 are retained between the plug insert 38 and the second housing 35. The plug insert 38 is held by the second housing 35. The ferrules 40, 41, and the plug insert 38 are held in place in accordance with practices well known in the art which can include adhesives, retaining clips, and thread fasteners. The second housing 35 also includes a second thread form 55. The biconical sleeve 44 has an aperture 51 which includes a first portion 52 and a second portion 53. The ferrule 41 is slidably mounted in the second portion 53 of the aperture 51. The first portion 52 of the aperture 51 has a shape that is complementary to a surface of a biconical housing.

Before the device 20 is assembled, sub-assemblies can first be constructed. One end of the first optical fiber 33 is terminated in the ferrule 31 and the other end of the first optical fiber 33 is terminated in the ferrule 41. One end of the second optical fiber 32 is terminated in the ferrule 29 and the other end of the second optical fiber 32 is terminated in the ferrule 40. The lenses 27, 28, the ferrules 29, 31, and the positioning post 25 are assembled into the plug insert 26. The parts assembled into the plug insert 26 and the plug insert 26 itself are placed loosely into the first housing 23 so that the plug insert 26 rests against a shoulder 66 so as to construct the expanded beam fiber optic connector 58. The expanded beam fiber optic connector 58 is then inserted into the main housing 30 so that the second thread form 56 of the first housing 23 is positioned within the interior of the main housing 30.

The physical contact fiber optic connector is next assembled. The ferrule 41 is attached to the spring seat 61, and the spring 43 is positioned adjacent to the spring seat 61, and then the spring seat 61 is positioned into the second housing 35. Likewise, the ferrule 40 is attached to the spring seat 61, and the spring 42 is positioned adjacent to the spring seat 62, and then the spring seat is positioned into the second housing 35. (The optical fibers 32, 33 may be terminated in the ferrules 40, 41 after the optical fiber 32, 33 have been threaded through the spring seats 61, 62.) Next, the biconical sleeve 44 is placed adjacent to the spring 43 and the spring seat 62, and the biconical housing 39 is placed adjacent to the spring 42 and the spring seat 62. The biconical sleeve 44, the biconical housing 39, springs 42, 43, and springs seats 61, 62 are retained between the second housing 35 and the plug insert 38 when the plug insert 38 is secured to the second housing 35 via set screws 64, 65 so as to construct the physical contact fiber optic connector 59.

Then the second thread form 55 of the second housing 35 is then introduced into the main housing 30 until the second thread form 55 of the second housing 35 is introduced to and is threaded onto the second thread form 56 of the first housing 23. The pin 57 and spring 34 are introduced through the plug insert 38 and into the plug insert 26 so that the ends of the pin 57 are retained in a direction perpendicular to the length of the pin 57 by the plug inserts 26, 38. The pin 57 is adjusted until the spring 34 is compressed enough so as to achieve a desired compression level. The pin 57 is held in place with a set screw (not shown) set in the plug insert 38 adjacent to an end of the pin 57. The desired compression level can be checked by pressing on the plug insert 26 until the plug insert 26 lifts off of the shoulder 66 of the first housing 23.

Figure 8:
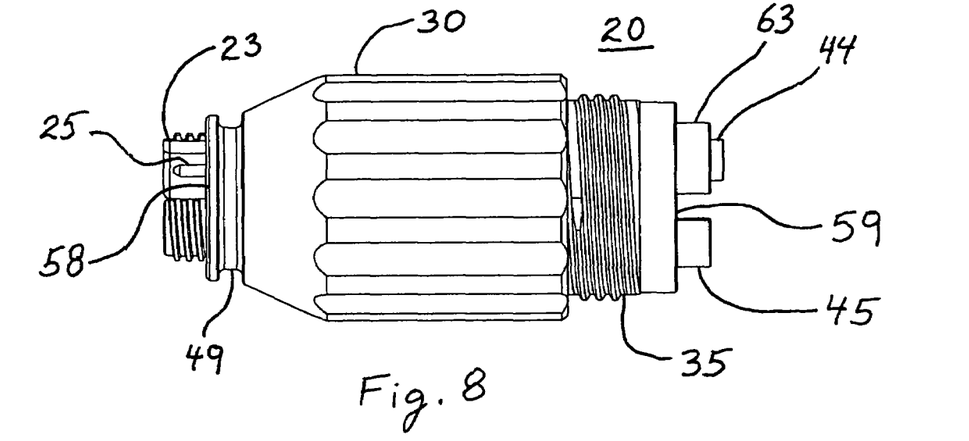
FIG. 8 is a side view of the fiber optic buildout converter of FIG. 7.

FIG. 8 is a side view of the of the fiber optic buildout converter 20 of FIG. 7. Shown are the main housing 30, expanded beam fiber optic connector 58, the physical contact fiber optic connector 59, the first housing 23, the second housing 35, keys 45, 63, biconical sleeve 44, positioning post 25, and the lanyard groove 49.

Figure 9:
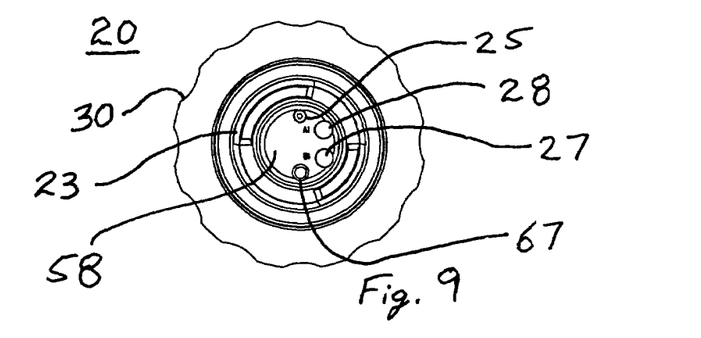
FIG. 9 is an end view of the fiber optic buildout converter of FIG. 8 which displays one of the two fiber optic connectors.

FIG. 9 is an end view of the fiber optic buildout converter 20 of FIG. 8 which displays the expanded beam fiber optic connector 58. Also displayed are the main housing 30, the first housing 23, the positioning post 25, lenses 27, 28, and an aperture 67. The aperture 67 accommodates a positioning post of a mating hermaphroditic fiber optic connector.

Figure 10:
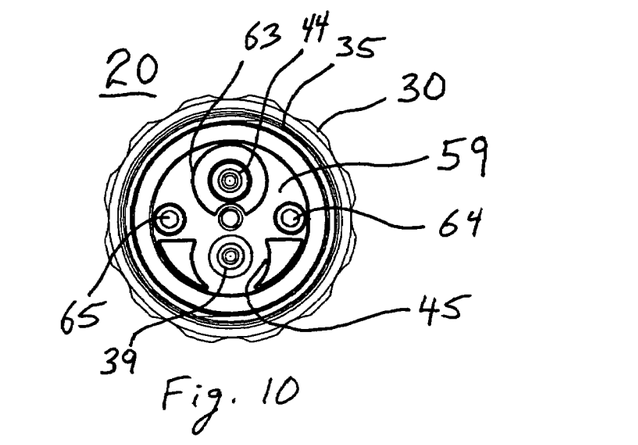
FIG. 10 is an end view of another end of the fiber optic buildout converter of FIG. 8 which displays the second of the two fiber optic connectors.

FIG. 10 is an end view of the fiber optic buildout converter 20 of FIG. 8 which displays the physical contact fiber optic connector 59. Also displayed are the main housing 30, the second housing 35, keys 45, 63, set screws 64, 65, biconical sleeve 44, and biconical housing 39.

Figure 11:
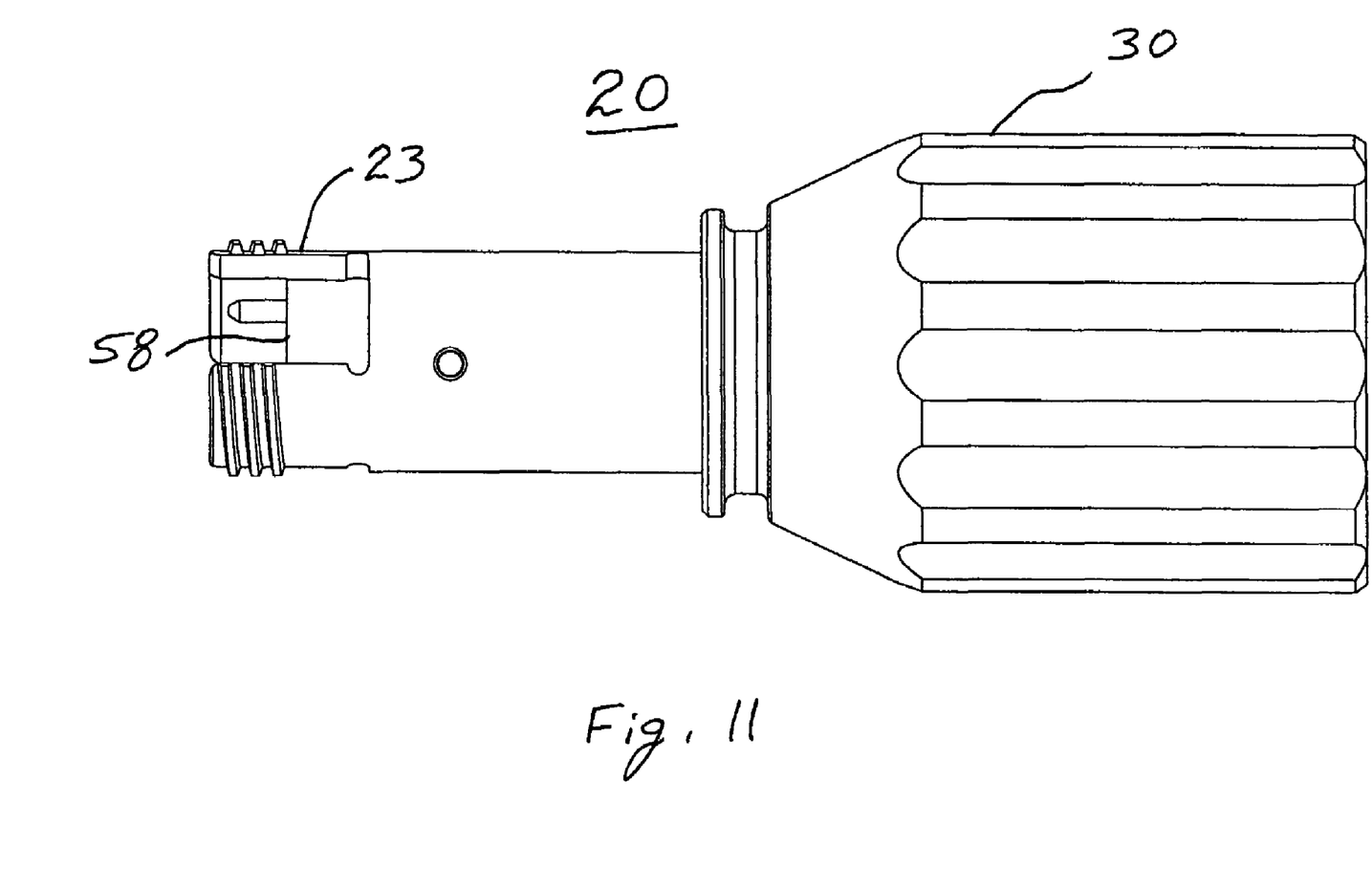
FIG. 11 is a side view of the fiber optic buildout converter of FIG. 8 in which the main housing moved towards the second of the two fiber optic connectors so that the fiber optic buildout converter can be attached to a bulkhead connector where the bulkhead connector is of an interface style that is compatible with the interface style of the second of the two fiber optic connectors.

FIG. 11 is a side view of the fiber optic buildout converter 20 of FIG. 8 in which the main housing 30 is moved towards the physical contact fiber optic connector 59 so that the physical contact fiber optic connector 59 can be attached to a physical contact fiber optic bulkhead connector. Also displayed are the expanded beam fiber optic connector 58, and the first housing 23.

The components are made from appropriate engineering materials. The ferrules 32, 33, 40, 41, are industry standard ceramic ferrules having an outer diameter of 2.5 millimeters.

As shown in FIG. 8, the fiber optic buildout converter 20 can have its expanded beam fiber optic connector 58 attached to a fiber optic cable having an expanded beam fiber optic connector, or an expanded beam fiber optic bulkhead connector. In the case of attaching to a fiber optic cable, the thread form 24 of the first housing 23 engages a complementary thread form of the mating device, and, in the case of attaching to a bulkhead connector, the thread form 54 of the main housing 30 engages a complementary thread form on a bulkhead connector.

As shown in FIG. 8, the fiber optic buildout converter 20 can have it physical contact fiber optic connector 59 attached to a fiber optic cable having a physical contact fiber optic connector. The thread form 36 of the second housing 35 engages a complementary thread form of the fiber optic connector of the fiber optic cable. When the physical contact fiber optic connector 59 is first introduced to a complementary fiber optic connector, the biconical housing 39, and the biconical sleeve 44 contact complementary surfaces which cause the biconical housing 39, and the biconical sleeve 44 to move towards the respective spring seats 62, 61, and compress the respective springs 42, 43. The biconical housing 39, and the biconical sleeve 44 continue to move relative to the respective ferrules 40, 41 until the ends of the ferrules 40, 41 contact the complementary biconical termini of the complementary connector. In regard to the ferrule 40 associated with the biconical housing 39, the end of the ferrule 40 will at least become flush with the edge of the biconical housing, or it will extend beyond the edge of the biconical housing 39 when the end of the ferrule makes physical contact with the complementary terminus. One such complementary connector is disclosed in FIG. 2. As discussed earlier, the connector disclosed in FIG. 2 conforms to the requirements set forth in the document identified as MIL-C-83526/13(CR), which is dated Jun. 9, 1989. The physical contact fiber optic connector 59 is compatible with and mateable to another connector that is the same as physical contact fiber optic connector 59, and it is also compatible with and mateable to another connector which conforms to the requirements set forth in the document identified as MIL-C-83526/13(CR), which is dated Jun. 9, 1989.

As shown in FIG. 2, the connector utilizes two biconical termini 3, and one biconical terminus sleeve 77. In contrast, the physical contact fiber optic connector 59 of the invention utilizes two ferrules 40, 41, a biconical housing 39, and a biconical sleeve 44. The standard available ferrules 40, 41 are plentiful, economical, and are of high quality. The novel use of the ferrules 40, 41 in conjunction with the respective biconical housing 39, and the biconical sleeve 44 eliminates the requirements to form the biconical surfaces of the biconical housing 39 and the biconical sleeve 44 to as tight of tolerances as required in the document identified as MIL-C-83526/13(CR), which is dated Jun. 9, 1989. Thus, cost savings are attained. Additionally, the physical contact fiber optic connector 59, due to the ability of the ferrules 40, 41 to move relative to the respective biconical housing 39, and biconical sleeve 44, is not as prone to inoperability due to debris being present on the biconical surfaces as is the device disclosed in FIG. 2.

The device or fiber optic buildout converter 20 provides a compact size and economical way to intermate between two fiber optic cables, or a fiber optic cable and a bulkhead connector, where the fiber optic connectors of the fiber optic cables, or the fiber optic cable and the bulkhead connector, are dissimilar.

Figure 12:
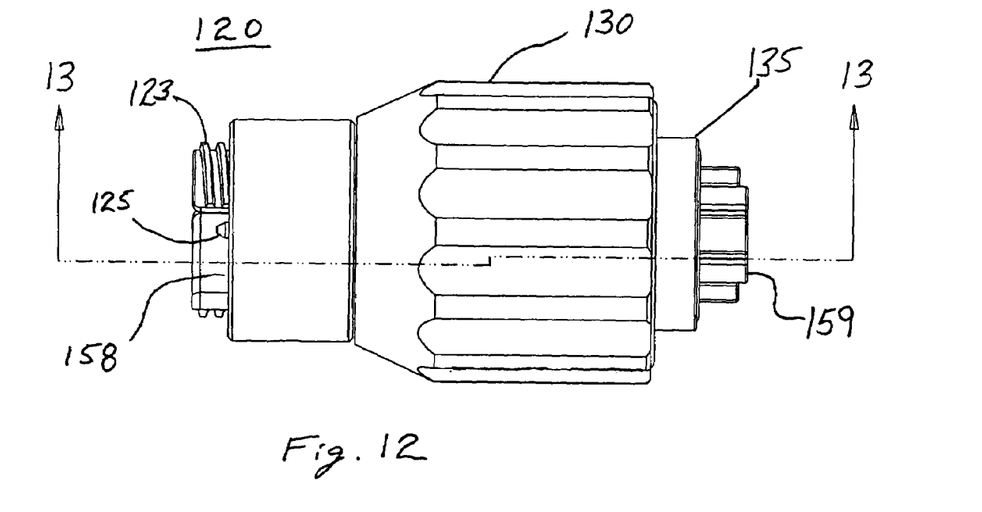
FIG. 12 is a side view of another embodiment of the fiber optic buildout converter.

FIGS. 12-15 display a second embodiment of the fiber optic buildout converter 120. FIG. 12 is a side view of the fiber optic buildout converter 120 which includes a nut main housing 130, a stop nut 230, a first housing 123, a second housing 135, a positioning post 125, a first fiber optic connector 158, and a second fiber optic connector 159.

Figure 13:
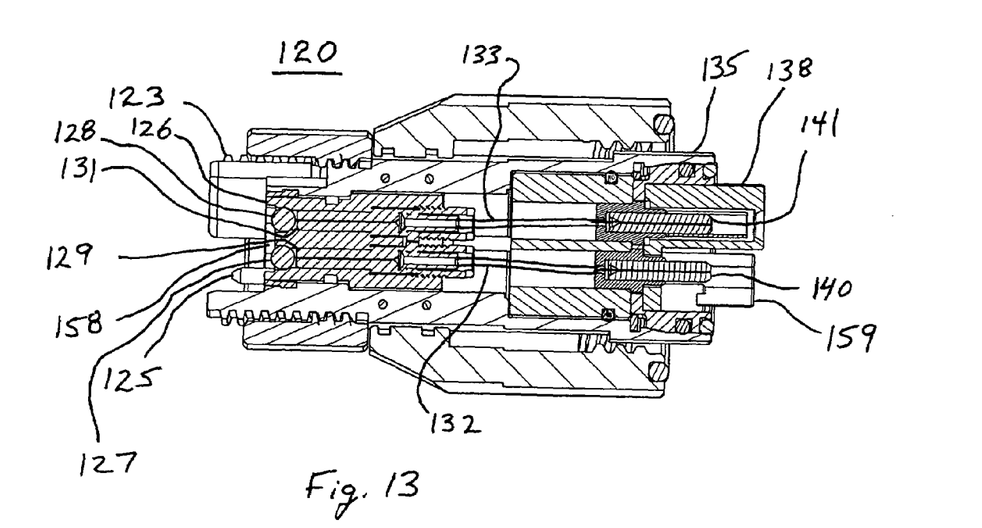
FIG. 13 is a cross-sectional view of the fiber optic buildout converter taken along section line 13-13 of FIG. 12.

FIG. 13 is a cross-section side view of the fiber optic buildout converter 120 taken along section line 13-13 of FIG. 12. The first fiber optic connector 158 is similar to the first fiber optic connector 58 of the first embodiment in that they are both expanded beam fiber optic connectors, however, instead of having two channels as in the first embodiment, the fiber optic connector 158 has four channels. In the cross-sectional view only two of the channels are shown. Shown are ferrules 129, 131, lenses 127, 128, the plug insert 126, the positioning post 125, and optical fibers 132, 133. The second fiber optic connector 159 is similar to the second fiber optic connector 59 of the first embodiment in that they are both physical contact fiber optic connectors, again however, instead of having two channels as in the first embodiment, the fiber optic connector 159 has four channels. Shown are ferrules 140, 141, plug insert 138, and second housing 135. Also different from the first embodiment, the physical contact fiber optic connector 159 does not have biconical termini or biconical surfaces. The physical contact fiber optic connector 159 is designed so as to be compatible and mateable with a connector where the connector conforms to a standard designated as MIL-PRF-83526/16.

Figure 14:
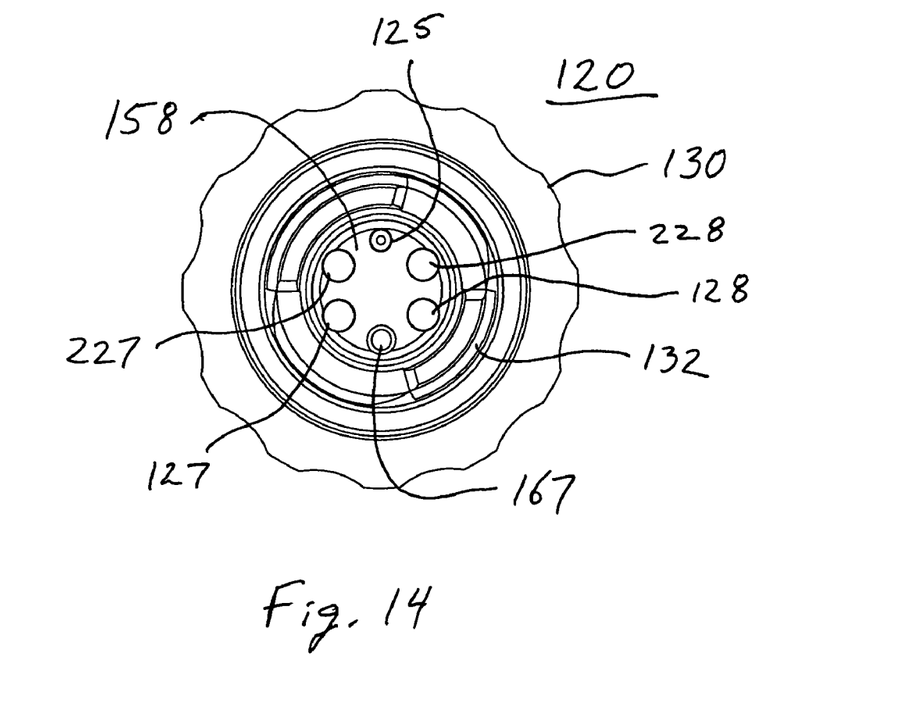
FIG. 14 is an end view of the fiber optic buildout converter of FIG. 12 which displays one of the two fiber optic connectors.

FIG. 14 is an end view of the fiber optic buildout converter 120 of FIG. 12 which displays the expanded beam fiber optic connector 158. Also displayed are the main housing 130, the first housing 123, the positioning post 125, lenses 127, 128, 227, 228 and an aperture 167. The aperture 167 accommodates a positioning post of a mating hermaphroditic fiber optic connector.

Figure 15:
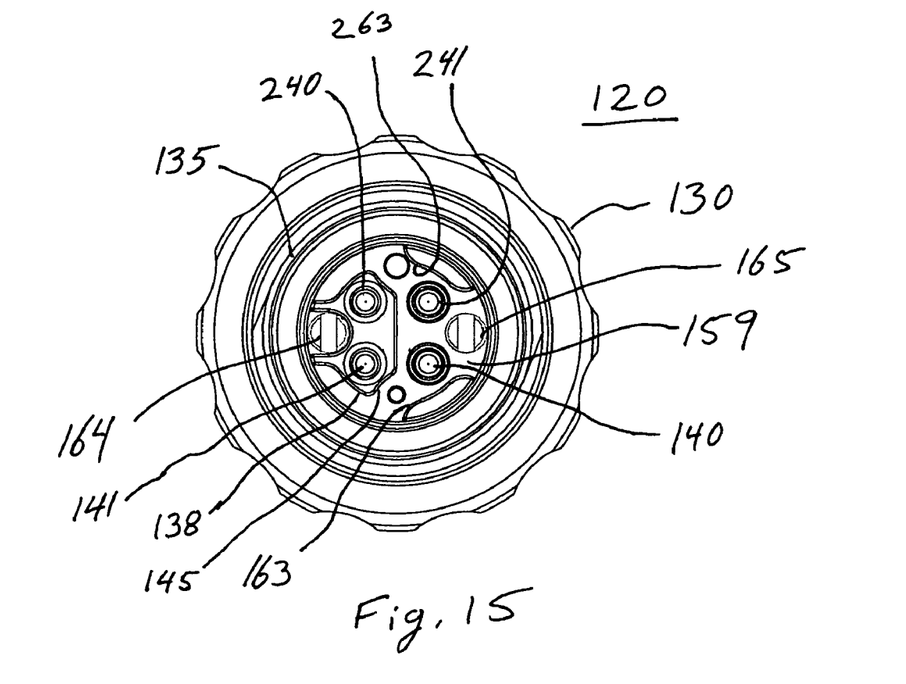
FIG. 15 is an end view of another end of the fiber optic buildout converter of FIG. 12 which displays the second of the two fiber optic connectors.

FIG. 15 is an end view of the fiber optic buildout converter 120 of FIG. 12 which displays the physical contact fiber optic connector 159. Also displayed are the main housing 130, the second housing 135, plug insert 138, keys 145, 163, 263 set screws 164, 165, and ferrules 140, 141, 240, 241.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
    a housing having a first end and a second end;
    a first fiber optic connector near the first end of the housing, the first fiber optic connector having a first interface style;
    a second fiber optic connector near the second end of the housing, the second fiber optic connector having a second interface style, and wherein the second interface style of the second fiber optic connector is different than the first interface style of the first fiber optic connector, and wherein the second fiber optic connector is in optical communication with the first fiber optic connector, and wherein the second interface style of the second fiber optic connector is compatible with and mateable to a physical contact fiber optic connector;
    a first optical fiber in optical communication with both the first fiber optic connector and the second fiber optic connector; and
    a second optical fiber in optical communication with both the first fiber optic connector and the second fiber optic connector.

2. A device according to claim 1 wherein the first fiber optic connector includes a first ferrule and a first lens, and wherein the first ferrule holds a first end of the first optical fiber, and wherein the first lens is in optical communication with the first end of the first optical fiber.

3. A device according to claim 2 wherein the first fiber optic connector includes a second ferrule and a second lens, and wherein the second ferrule holds a first end of the second optical fiber, and wherein the second lens is in optical communication with the first end of the second optical fiber.

4. A device according to claim 3 wherein the first lens is a ball lens, and the second lens is a ball lens.

5. A device according to claim 4 wherein the second interface style of the second fiber optic connector is compatible with and mateable to a connector where the connector conforms to a standard designated as MTL-C-83526/13 (CR).

6. A device according to claim 2 wherein the first lens is a ball lens.

7. A device according to claim 6 wherein the second fiber optic connector includes a first biconical housing, and wherein the first biconical housing holds a second end of the first optical fiber.

8. A device according to claim 7 wherein the first biconical housing includes an aperture, and the first biconical housing includes a second ferrule slidably mounted in the aperture of the first biconical housing.

9. A device comprising:
    a housing having a first end and a second end;
    a first fiber optic connector near the first end of the housing, the first fiber optic connector having a first interface style, and wherein the first interface style of the first fiber optic connector is compatible with and mateable to an expanded beam fiber optic connector;
    a second fiber optic connector near the second end of the housing, the second fiber optic connector having a second interface style, and wherein the second interface style of the second fiber optic connector is different than the first interface style of the first fiber optic connector, and wherein the second fiber optic connector is in optical communication with the first fiber optic connector;
    a first optical fiber in optical communication with both the first fiber optic connector and the second fiber optic connector; and
    a second optical fiber in optical communication with both the first fiber optic connector and the second fiber optic connector.

10. A device according to claim 9 wherein the second interface style of the second fiber optic connector is compatible with and mateable to a physical contact fiber optic connector.

11. A device according to claim 10 wherein the second interface style of the second fiber optic connector is compatible with and mateable to a connector where the connector conforms to a standard designated as MIL-C-83526/13 (CR).

12. A device according to claim 10 wherein the second interface style of the second fiber optic connector is compatible with and mateable to a connector where the connector conforms to a standard designated as MIL-PRF-83526/16.

13. A device comprising:
    a main housing having a first end and a second end;
    a first housing located near the first end of the main housing, the first housing having a first thread form for connection with at least one of a first dust cap and an expanded beam fiber optic connector;

a second housing located near at least one of the first end of the main housing and the second end of the main housing, the second housing having a second thread form for connection with at least one of a second dust cap and a physical contact fiber optic connector;

a first ferrule mounted to the first housing;

a second ferrule mounted to the first housing;

a first ball lens mounted to the first housing;

a second ball lens mounted to the first housing;

a biconical housing mounted to the second housing, the biconical housing having a first aperture;

a third ferrule slidably mounted in the first aperture of the biconical housing;

a biconical sleeve mounted to the second housing, the biconical sleeve having a second aperture;

a fourth ferrule slidably mounted in the second aperture of the biconical sleeve;

a first optical fiber having a first end and a second end, the first end of the first optical fiber is terminated in the first ferrule, and the second end of the first optical fiber is terminated in the third ferrule, and the first end of the first optical fiber is in optical communication with the first ball lens;

a second optical fiber having a third end and a fourth end, the third end of the second optical fiber is terminated in the second ferrule, and the fourth end of the second optical fiber is terminated in the fourth ferrule, and the third end of the second optical fiber is in optical communication with the second ball lens.

* * * * *